(12) United States Patent
Chou

(10) Patent No.: US 6,394,266 B1
(45) Date of Patent: May 28, 2002

(54) DVD RETAINING STRUCTURE FOR DVD CASE

(75) Inventor: Shou Ming Chou, Chungho (TW)

(73) Assignee: Ritek Corporation, Hsin Chu (TW)

( * ) Notice: Subject to any disclaimer, the term of this patent is extended or adjusted under 35 U.S.C. 154(b) by 0 days.

(21) Appl. No.: 09/897,122

(22) Filed: Jul. 3, 2001

(51) Int. Cl.$^7$ ............................................... B65D 85/57
(52) U.S. Cl. ............................. 206/308.1; 206/310
(58) Field of Search ........................... 206/308.1, 310, 206/309, 311, 312, 493

(56) References Cited

U.S. PATENT DOCUMENTS

| | | | | |
|---|---|---|---|---|
| 5,526,926 A | * | 6/1996 | Deja | 206/308.1 |
| 5,788,068 A | * | 8/1998 | Fraser et al. | 206/308.1 |
| 5,944,181 A | * | 8/1999 | Lau | 206/308.1 |
| 6,196,384 B1 | * | 3/2001 | Belden, Jr. | 206/308.1 |
| 6,227,362 B1 | * | 5/2001 | Cheung | 206/308.1 |
| 6,250,461 B1 | * | 6/2001 | Hu | 206/308.1 |

* cited by examiner

Primary Examiner—Luan K. Bui
(74) Attorney, Agent, or Firm—Rosenberg, Klein & Lee

(57) ABSTRACT

A DVD retaining structure is constructed in a DVD holder plate inside a DVD case and adapted to hold an individual DVD, including a deformable keeper and a plurality of spring strips around said keeper, each spring strip having a free end terminating in a smoothly curved contact portion, the keeper having a plurality of recessed portions spaced around the periphery thereof and adapted to receive the contact portion of each of the spring strips, prohibiting the spring strips from rubbing against the DVD during its loading or unloading procedure.

2 Claims, 8 Drawing Sheets

DVD RETAINING STRUCTURE FOR DVD CASE

BACKGROUND OF THE INVENTION

The present invention relates to a DVD (digital video disk) case and, more specifically, to a DVD retaining structure adapted to hold a DVD in a DVD case, which does not scratch the bottom surface of the DVD during loading/unloading of the DVD.

A DVD (digital video disk) is a digital video data storage medium. When not in use, the DVD must be well protected against dust because dust tends to damage digital signal on the surface of the DVD. DVD users may use disk cases to keep DVDs. Regular DVD cases commonly use a DVD holder plate with a keeper to hold an individual DVD. There are known DVD holder plates having spring strips disposed around the keeper and adapted to eject the storage DVD out of the keeper upon deformation of the keeper by the pressing of the user's finger. FIG. 1 shows a DVD retaining structure constructed according to the prior art. The DVD retaining structure 1a is installed in the center of the DVD holder plate 30a of a DVD case 3a, comprising a keeper 10a and a plurality of spring strips 11a. The keeper 10a has a connecting portion 100a connected to the shell 30a, a top retaining flange 101a outwardly extended around the periphery of the top thereof, and top grooves 102a, which enable the keeper 10a to be deformed to lock/unlock the loaded DVD when pressed with the finger. Referring to FIGS. From 2 through 4, when fastening a DVD 2a to the DVD retaining structure 1a, the DVD 2a is closely attached to the surface 110a of the spring strips 11a, the keeper 10a is forced to deform and to let the top retaining flange 110a of the keeper 10a pass through the center hole of the DVD 2a. When release the hand from the DVD 2a, the spring strips 11a push the DVD 2a upwards against the top retaining flange 110a, and therefore the DVD 2a is secured in position between the top retaining flange 110a and the spring strips 11a. When pressing the top of the keeper 10a with the finger, the keeper 10a is deformed to disengage the top retaining flange 101a from the DVD 2a, and the spring power of the spring strips 11a immediately forces the DVD 2a away from the keeper 10a. This design of DVD retaining structure 1a is functional, however because the DVD 2a is disclosed in close contact with the surface 110a of the spring strips 11a, the spring strips Ha may scrape the DVD 2a upon loading/unloading of the DVD 2a, causing damage to the surface of the DVD 2a.

SUMMARY OF THE INVENTION

The present invention has been accomplished under the circumstances in view. It is the main object of the present invention to provide a DVD retaining structure for DVD case, which eliminates the aforesaid problem. It is therefore the main object of the present invention to provide a DVD retaining structure for DVD case, which does not scratch the bottom surface of the DVD during loading/unloading of the DVD. According to the present invention, the DVD retaining structure comprises a keeper adapted to hold an individual DVD, and spring strips disposed around the keeper and adapted to eject the storage DVD out of the keeper when the keeper is pressed to deform by the user. The spring strips each have a free end terminating in a smoothly curved contact portion. The keeper has a plurality of recessed portions spaced around the periphery thereof and adapted to receive the contact portion of each of the spring strips, prohibiting the spring strips from rubbing against the DVD during its loading or unloading procedure.

DETAILED DESCRIPTION OF THE PREFERRED EMBODIMENT

Figure 1:
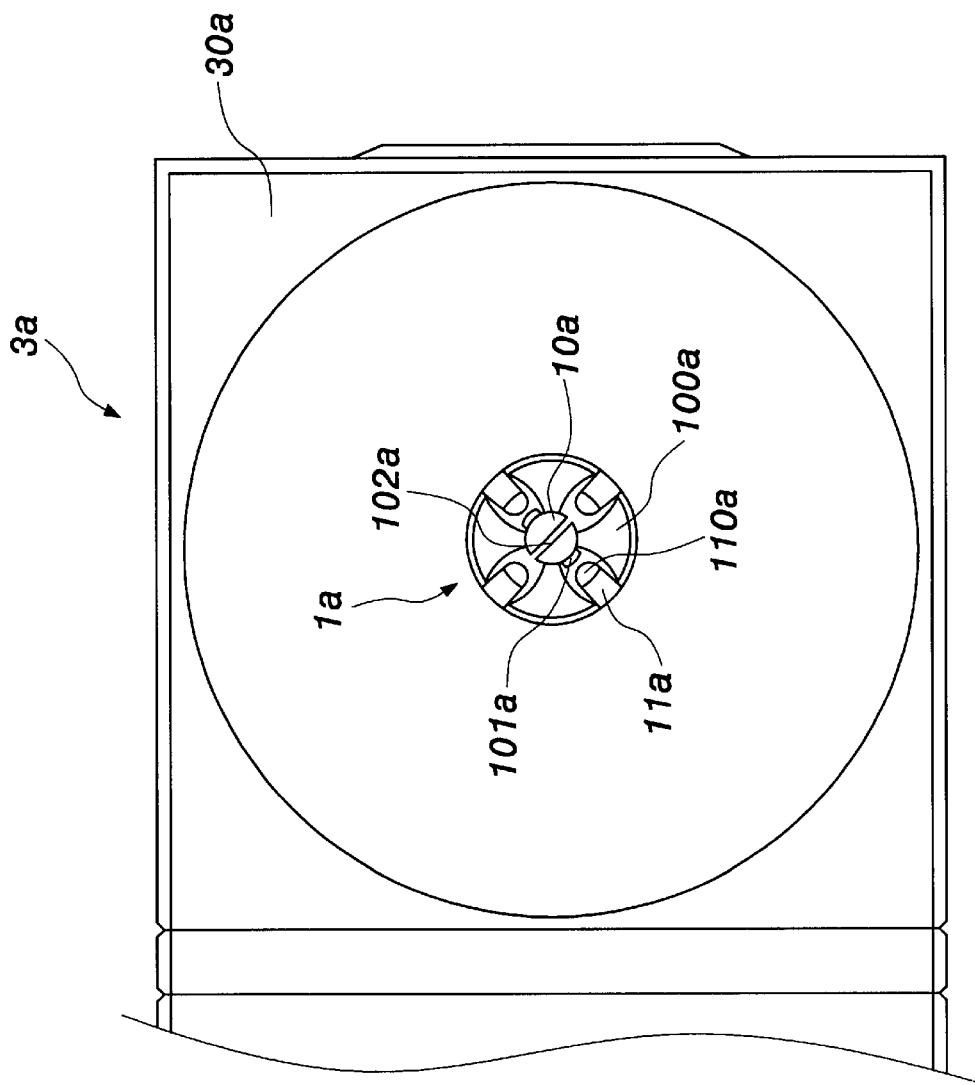
FIG. 1 is a top view of a part of the DVD holder plate of a DVD case constructed according to the prior art.
Figure 2:
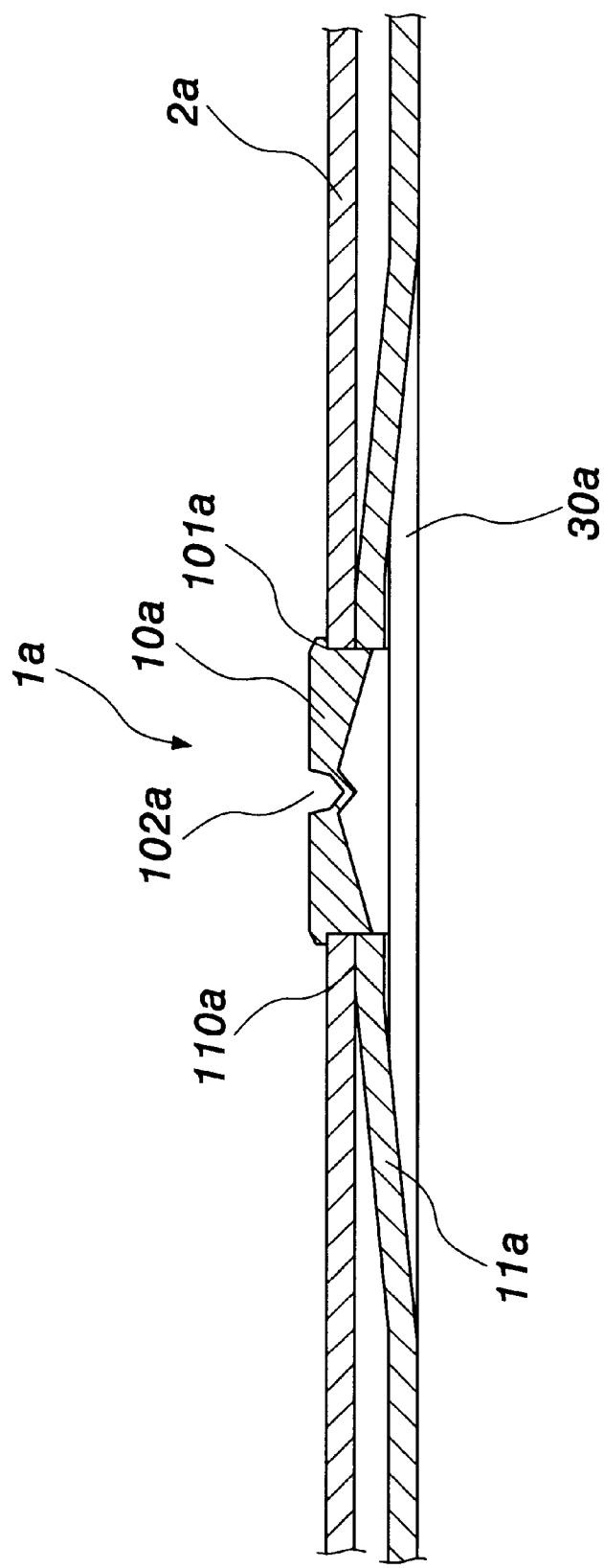
FIG. 2 is a sectional view of the DVD retaining structure of the prior art DVD case, showing a DVD fastened to the keeper of the DVD retaining structure.
Figure 3:
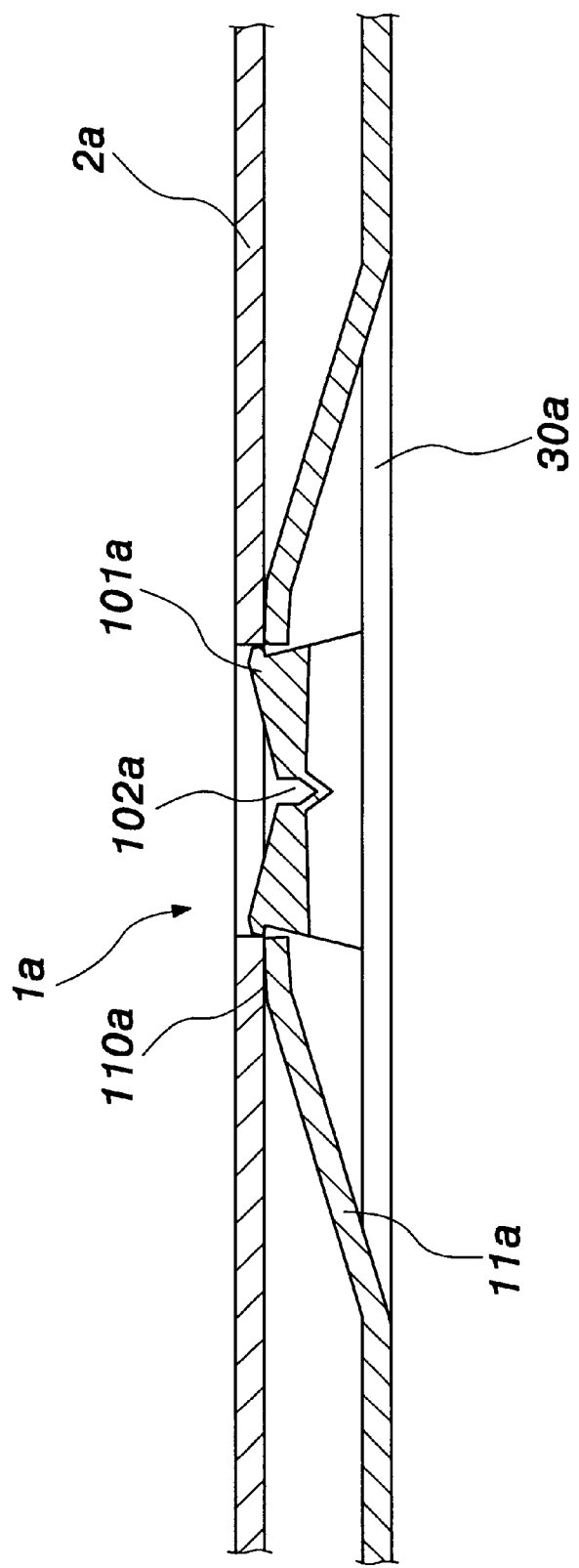
FIG. 3 is similar to FIG. 2 but showing the DVD unlocked.
Figure 4:
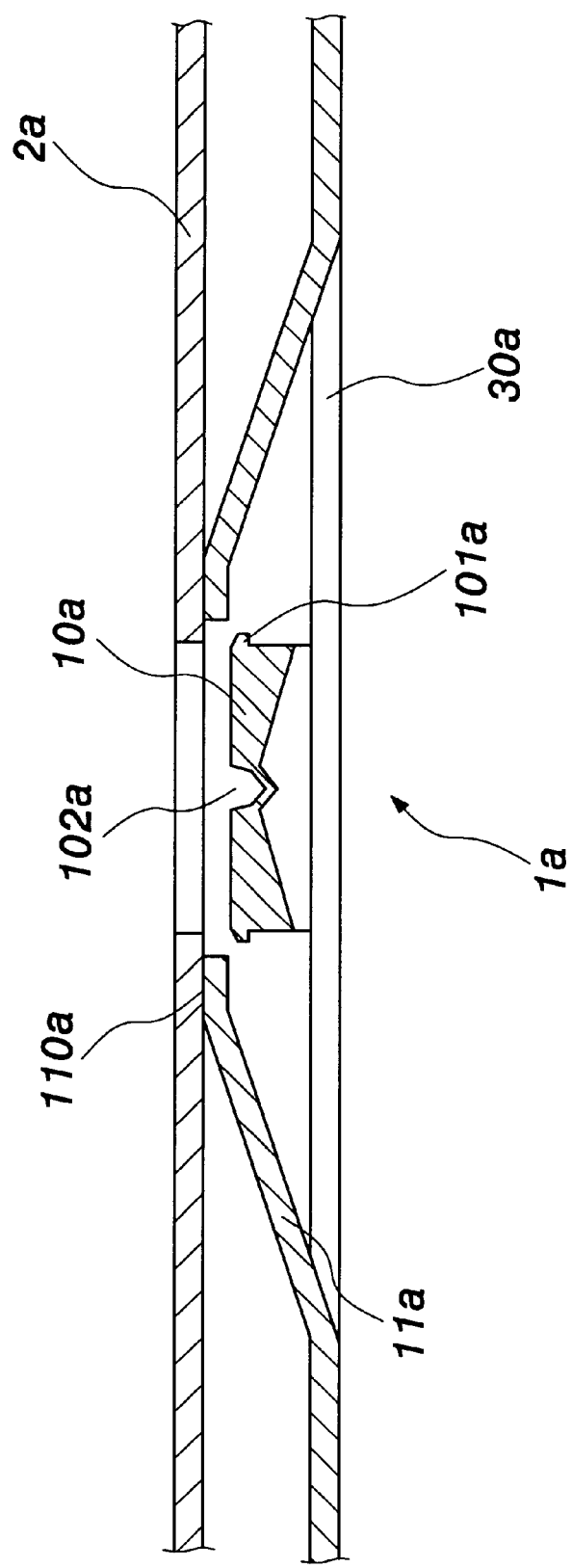
FIG. 4 is similar to FIG. 2 but showing the spring strips released, the DVD forced out of the keeper.
Figure 5:
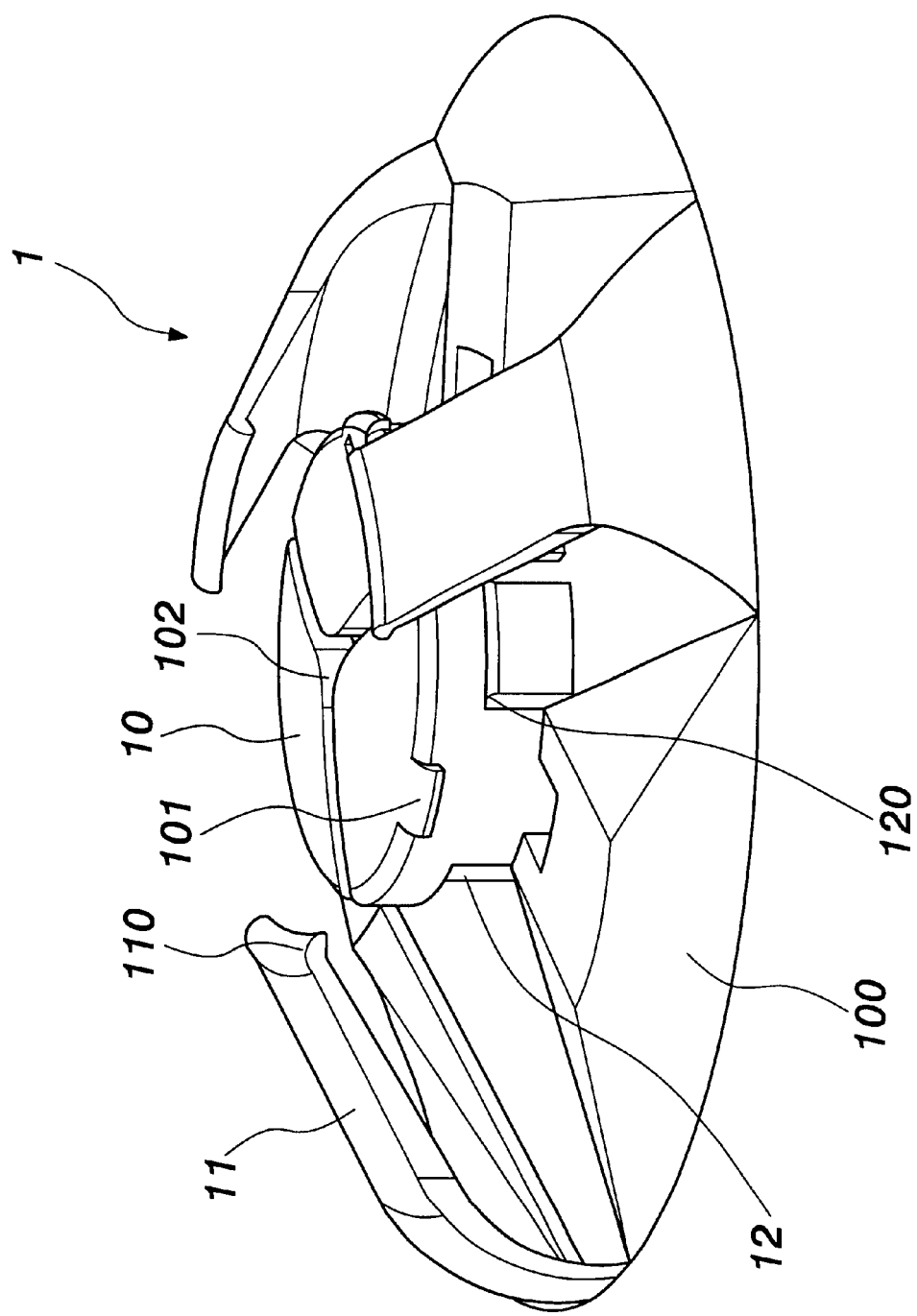
FIG. 5 is a perspective view of a DVD retaining structure constructed according to the present invention.
Figure 8:
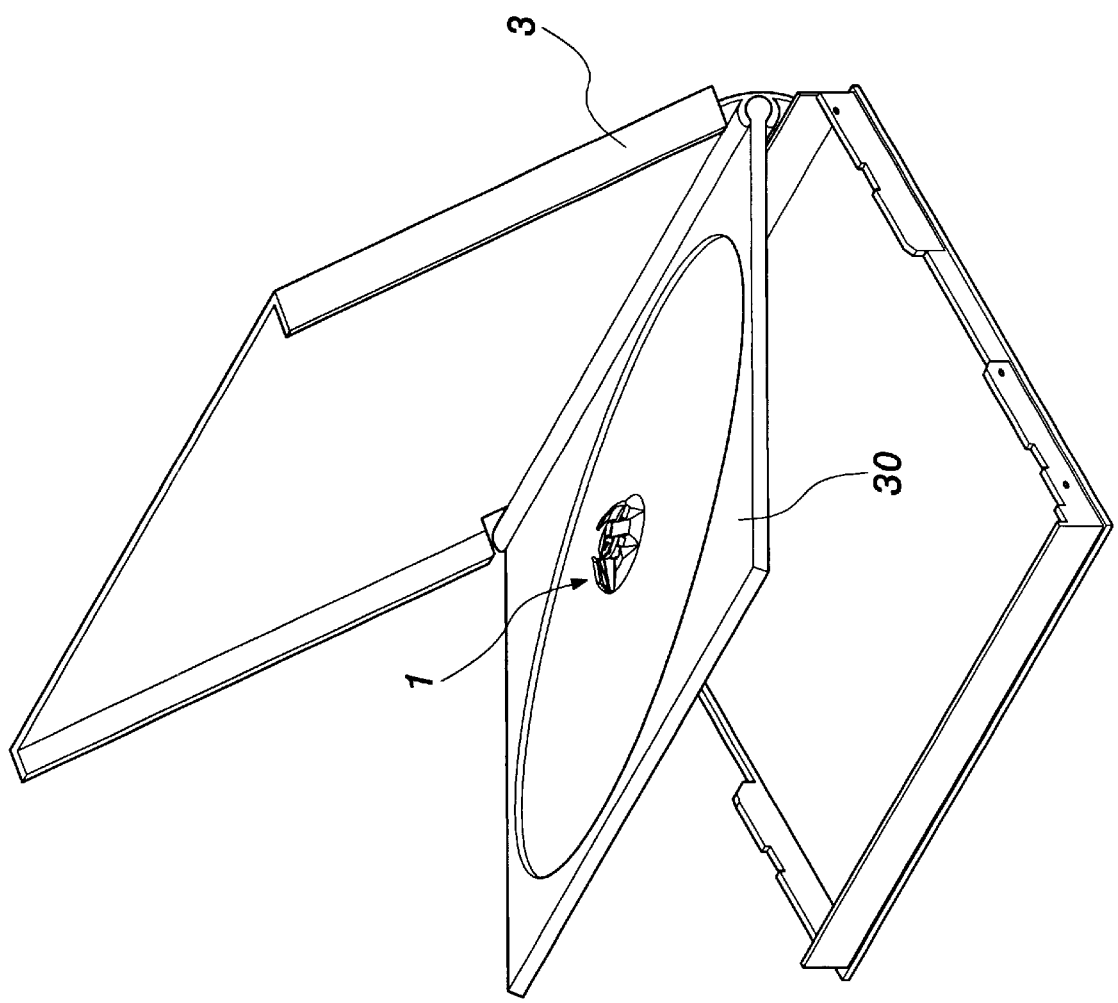
FIG. 8 is an opened view of a DVD case constructed according to the present invention.

Referring to FIGS. 5 and 8, a DVD retaining structure 1 is installed in the center of the DVD holder plate 30 of a DVD case 3, comprising a keeper 10, and a plurality of spring strips 11. The keeper 10 comprises a plurality of bottom connecting portions 100 respectively radially connected to the DVD holder plate 30, a plurality of recessed portions 12 spaced around the periphery and separated from one another by the bottom connecting portions 100, a plurality of top projections 101 radially outwardly extended from the periphery of the top thereof, and top grooves 102 in the top, which enable the keeper 10 to be deformed to lock/unlock the loaded DVD when pressed with the finger. The recessed portions 12 each have a contact face 120. The spring strips 11 are disposed between each two adjacent bottom connecting portions 100 of the keeper 10 and respectively aimed at the recessed portions 12 of the keeper 10, each having a fixed end connected to the DVD holder plate 30 and a free end terminating in a smoothly curved contact face 110.

Figure 6:
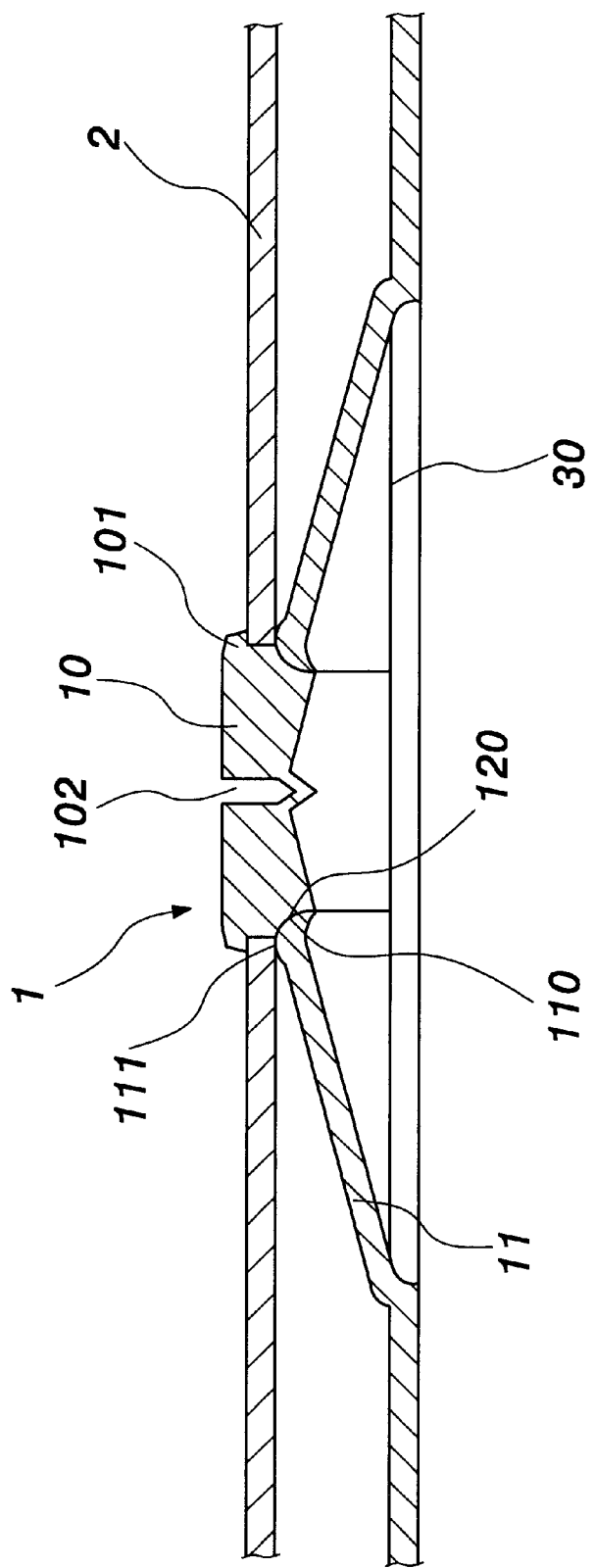
FIG. 6 is a sectional view of the present invention, showing a DVD fastened to the DVD retaining structure.

Referring to FIG. 6, when a DVD 2 is fastened to the DVD retaining structure 1 and retained in position between the spring strips 11 and the projections 101 of the keeper 10, the smoothly curved contact face 110 of each of the spring strips 11 is respectively maintained in contact with the contact face 120 of each of the recessed portions 12 of the keeper 10, and only the topmost edge 111 of the contact face 110 of each of the spring strips 11 is maintained in contact with the bottom surface of the DVD 2. Because the contact between the contact face 110 of each of the spring strips 11 and the DVD 2 is a line of contact, loading the DVD 2 does not cause the spring strips 11 to scratch the DVD 2, i.e., loading the DVD 2 does not cause damage to the DVD 2.

Figure 7:
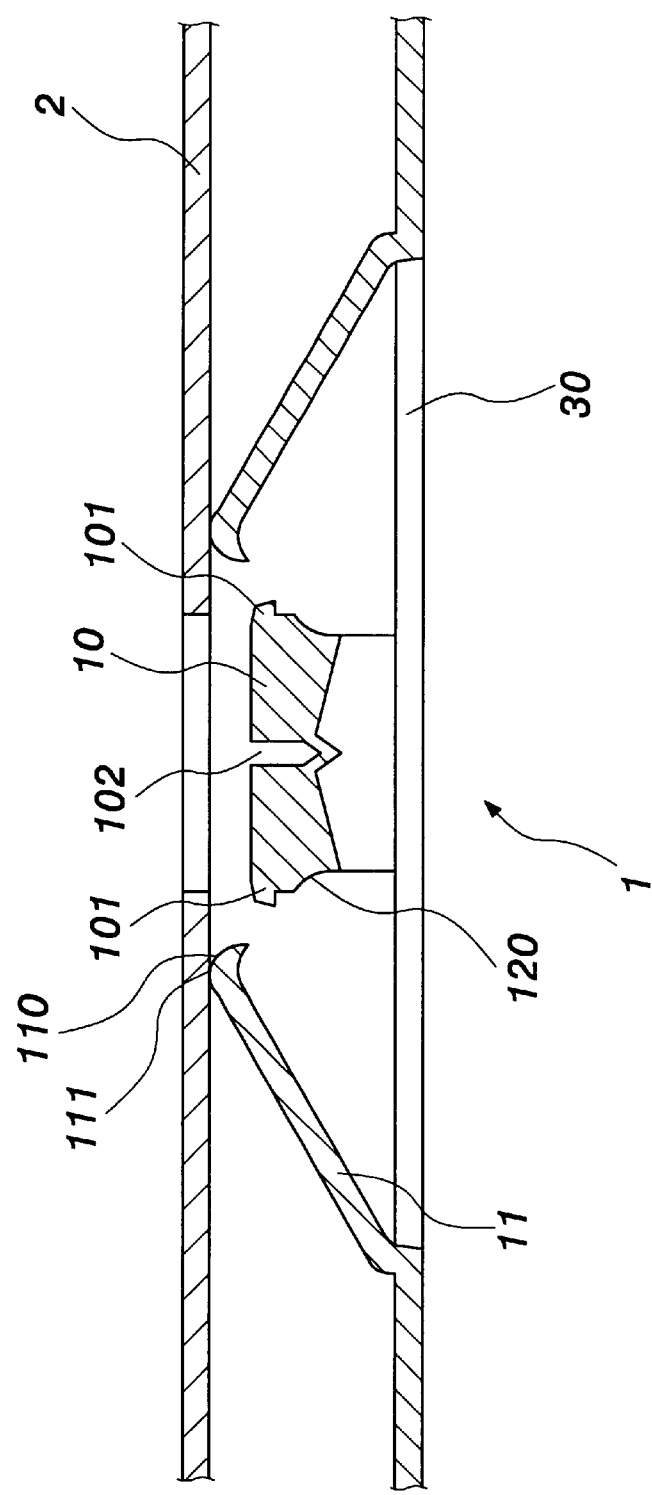
FIG. 7 is another sectional view of the present invention, showing the spring strips disengaged from the keeper, the DVD moved away from the keeper.

Referring to FIG. 7, because each spring strip 11 has only the topmost edge 111 of its smoothly curved contact face 110 disposed in contact with the bottom surface of the DVD 2, removing the DVD 2 from the DVD retaining structure 1 does not causes the spring strips 11 to rub against the bottom surface of the DVD 2.

FIG. 8 is an opened view of a DVD case 3 constructed according to the present invention. According to this embodiment, the DVD case 3 has a hinged DVD holder plate 30 with a DVD retaining structure 1 for holding an individual DVD. Alternatively, a DVD case 3 can be made having multiple DVD holder plates 30 adapted to hold an individual DVD respectively.

A prototype of DVD retaining structure for DVD case has been constructed with the features of FIGS. 5~8. The DVD retaining structure for DVD case functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A DVD (digital video disk) retaining structure comprising a deformable keeper and a plurality of spring strips around said keeper and adapted to hold an individual DVD in a DVD case, wherein said spring strips each have a free end terminating in a smoothly curved contact portion, and said keeper comprises a plurality of recessed portions spaced around the periphery thereof and adapted to receive the contact portion of each of said spring strips respectively.

2. The DVD (digital video disk) retaining structure of claim 1 wherein said keeper has grooves on the topmost edge thereof for enabling said keeper to be deformed for the loading/unloading of a DVD.

* * * * *